Aug. 27, 1963 S. A. DI PONTE 3,101,556
ALPHABET SET FOR THE PRACTICAL TEACHING OF READING AND WRITING
Filed March 25, 1960
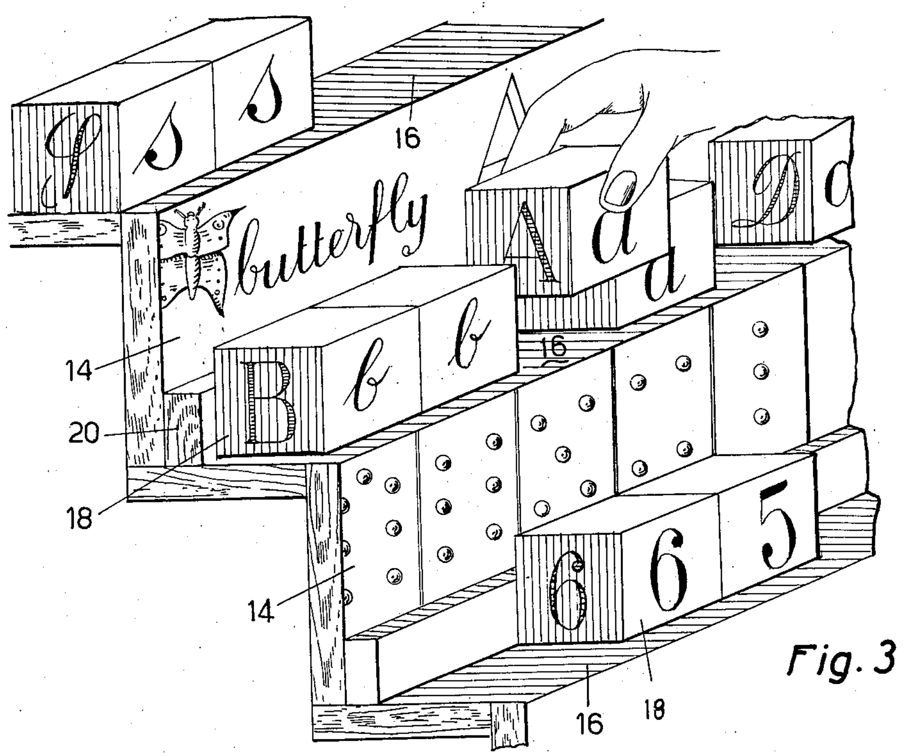
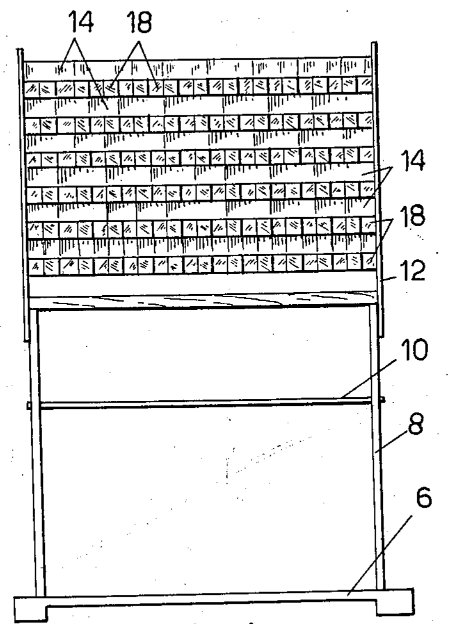
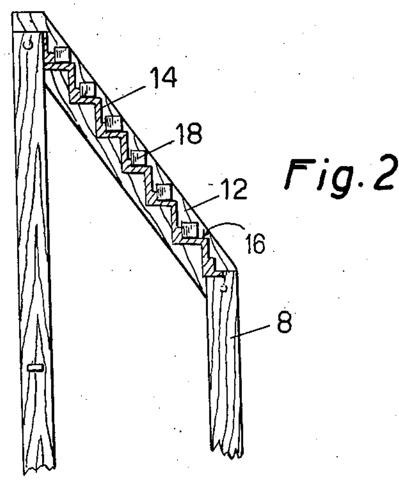
INVENTOR.
Sabato Antonio Di Ponte
BY
Richards & Geier
ATTORNEYS United States Patent Office 3,101,556

Patented Aug. 27, 1963

3,101,556

ALPHABET SET FOR THE PRACTICAL TEACHING OF READING AND WRITING

Sabato Antonio Di Ponte, Via G. Marconi 10, Casalciprano, Italy

Filed Mar. 25, 1960, Ser. No. 17,530
Claims priority, application Italy Mar. 28, 1959
1 Claim. (Cl. 35—35)

The child who goes to school for the first time undergoes a transition from playing at home, in the garden or at kindergarten, to a first form of work.

Experts on elementary teaching, however, agree that the young students must be given the impression, in their first contacts with the schoolroom, that going to school is just as pleasant as playing. The alphabet set which forms the object of this invention is intended to achieve this purpose, and is designed to appear to the child as one of the many games in which figures are composed by the juxtaposition of cubes, each of which carries on one of its faces one element of the figure to be composed. In the case of the alphabet set according to the invention, the cubes are inscribed on one or more of their faces with letters, figures, punctuation marks and any other element required to compose words or figures, the display of such mobile elements being made in combination with other fixed figures connected with the use of the cubes by a relationship which is at the same time of location and memory.

The cubes are arranged on the steps of a special stand, such steps being spaced vertically by such a distance as to leave in sight, when cubes are lined across the whole step, a strip on which appear the graphic and illustrated elements corresponding to the cube opposite, and this arrangement makes it easier to recompose the picture after two or more of the cubes have been removed for the purpose which will be explained below.

The front faces of the steps which remain visible above the cubes, and one face of the cubes themselves, are in vertical position and entirely visible on the stand.

Figures, words, letters, marks and digits are inscribed on the set. The vertical faces of the steps opposite the cubes are divided into various parts by inscribed lines. In each part, for the presentation of alphabet letters and digrams, there is inscribed the likeness of an object or animal, suitably colored, with the name of the object or animal in italics type. On the side of the figure there is repeated the initial letter of the underlying name, in lower case and capital, italics and block type, so that the student can memorise the letter in both the handwritten and printed forms.

Opposite the vertical faces of the steps described, the cubes, as indicated above, are laid on the horizontal plane of the steps. These cubes are inscribed on the faces in sight with the alphabet letters, in lower-case italics, corresponding to the initial letters of the names inscribed in the spaces above, and these letters will be repeated a number of times depending on the frequency with which the letter is presumably to be used in the composition of words or short phrases, as indicated below.

On the opposite faces of the cubes there will be inscribed the corresponding capital letters. The number of steps on which the cubes are supported will be such as to accommodate not only the cubes representing all letters, vowels and consonants, of the alphabet in the various characters (capital, lower case, italics and block) and in sufficient number to compose words and short phrases, but also to accommodate digits arranged in increasing order from zero to nine and in decreasing order from nine to zero, while in a row below that of digits there will be shown again on the vertical faces of the steps, as many squares in which digits will be portrayed by a corresponding number of colored dots.

Other details of this aid for the elementary teaching of the reading and writing are more clearly shown in the enclosed table of drawings, in which:

FIG. 1 is a simplified front view of the alphabet set;

FIG. 2 is a cross-section view of the same;

FIG. 3 is a detailed view of a part of the set, showing for purposes of exemplification the presentation of the various figures and letters on the cubes.

With reference to the figures, the stand comprises a base 6 which, by means of uprights 8 and braces 10, supports two sloping sides 12, which in turn support a stepped structure consisting of vertical strips 14 and horizontal planes 16.

A set of cubes, designated generally as 18, occupies, when the alphabet set is in the initial position each of the steps, which will be in sufficient number and length (also in relation to the size of the individual cubes) to present to the view all vowels, consonants, diphthongs and digrams of the alphabet; while a number of lower steps will be reserved to the composition of the words and simple and elementary phrases which supplement the knowledge of the alphabet. The young student, starting from the figurative representation of the initial of the word he wants to compose, will then select the cube corresponding to the initial letter, removing it in one of the free steps, having it followed by all other letters (vowels, consonants, accents, apostrophes) till completion of the word and elementary phrase to be composed.

On one or more steps of the alphabet set are arranged the cubes representing the digits, in a first set from zero to nine and in a second set from nine to zero. On the vertical strip 14 behind these cubes are shown not the digits but figures consisting of colored dots which represent the digits in the same fashion as on domino pieces, and thus the child establishes mentally a connection between the mark representing the digit and the digit itself. Also on the same step are arranged the marks for the four simple operations (+; —; :; ×) and the mark =.

The lower steps of the set are intended to accommodate the cubes forming a word or short phrases, and therefore the vertical strips corresponding to these steps are left blank.

As it is clearly shown in FIG. 3, the corner of the internal dihedral angle formed by vertical strips 14 and horizontal surface 16 of each step is fitted with a strip 20, nailed, glued or otherwise affixed, the height of which is lower than that of cube 18, so as to facilitate the removal and placement of the cube itself.

The work of composition of the words and elementary phrases on the part of the young student, done as indicated above, will be followed by the work of de-composition intended to restore each cube to its original position opposite the figure inscribed on the vertical fixed strip 14.

Although but one embodiment of the present invention has been illustrated and described, it will be apparent to those skilled in the art that various changes and modifications may be made therein without departing from the spirit of the invention or from the scope of the appended claim.

What I claim is:

An alphabet set for the practical teaching of reading and writing, comprising a stand having a plurality of steps, each of said steps having vertical and horizontal surfaces, a number of sets of cubes removably supported on the horizontal surfaces of some of said steps, said cubes carrying indicia designating letters, digits, punctuation marks and numerals, said cubes being of lesser height than the vertical surfaces of the steps wherein they are supported, the vertical surfaces of the steps carrying said cubes having strips arranged above the cubes on said steps and which carry indicia corresponding to that on said cubes and other indicia designating preselected words and phrases, whereby said cubes may be arranged on others of said steps in a sequence corresponding to said other indicia, for composing words and phrases, further comprising a spacer strip firmly connected to each of said steps at the intersection of said vertical and said horizontal surfaces for supporting said cubes on said steps in spaced relation with said vertical surfaces, said spacer strips being of lesser heights than said cubes.

References Cited in the file of this patent

UNITED STATES PATENTS

| | | |
|---|---|---|
| 1,354,910 | Ketchum | Oct. 5, 1920 |
| 1,479,423 | Barton | Jan. 1, 1924 |
| 2,581,595 | Mioduski et al. | Jan. 8, 1952 |
| 2,635,360 | Bishop | Apr. 21, 1953 |
| 2,722,061 | Webster | Nov. 1, 1955 |

FOREIGN PATENTS

| | | |
|---|---|---|
| 185,581 | Austria | May 11, 1956 |
| 16,518 | Great Britain | 1907 |
| 86,848 | Norway | Feb. 6, 1956 |